(12) United States Patent
Mao et al.

(10) Patent No.: US 11,425,237 B2
(45) Date of Patent: Aug. 23, 2022

(54) MOBILE TERMINAL

(71) Applicant: Huawei Technologies Co., Ltd., Shenzhen (CN)

(72) Inventors: Weihua Mao, Shanghai (CN); Ren Lv, Shanghai (CN); Bo Wu, Shanghai (CN); Peng Zha, Shanghai (CN); Bo Huang, Shanghai (CN); Haowen Xu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/058,266

(22) PCT Filed: Mar. 5, 2019

(86) PCT No.: PCT/CN2019/076907
§ 371 (c)(1),
(2) Date: Nov. 24, 2020

(87) PCT Pub. No.: WO2019/223395
PCT Pub. Date: Nov. 28, 2019

(65) Prior Publication Data
US 2021/0218834 A1    Jul. 15, 2021

(30) Foreign Application Priority Data

May 25, 2018  (CN) .......................... 201810516864.7
Jul. 26, 2018  (WO) ................. PCT/CN2018/097289

(51) Int. Cl.
*H04M 1/02*        (2006.01)
*H04M 1/73*        (2006.01)

(52) U.S. Cl.
CPC ....... *H04M 1/0266* (2013.01); *H04M 1/0262* (2013.01); *H04M 1/73* (2013.01)

(58) Field of Classification Search
None
See application file for complete search history.

(56) References Cited

U.S. PATENT DOCUMENTS 9,288,374 B1 *  3/2016  Cooper .............. H04N 5/23222
9,565,738 B2    2/2017  Ka et al.
(Continued)

FOREIGN PATENT DOCUMENTS

CN        103927938 A       7/2014
CN        204241802 U       4/2015
(Continued)

*Primary Examiner* — Ernest G Tacsik
(74) *Attorney, Agent, or Firm* — Conley Rose, P.C.

(57) ABSTRACT

A mobile terminal includes a middle frame, a battery cover, and a display. A first groove and a second groove are provided on each of a left-side wall and a right-side wall of the middle frame, and the first groove and the second groove share a part of the side wall. The display is disposed in one of the first grooves, and the battery cover is disposed in one of the second grooves. The display includes an obverse-side display area and two arc-shaped display areas located on two sides of the obverse-side display area, indent surfaces of the two arc-shaped display areas are disposed opposite to each other, and a vertical distance between end portions of the two arc-shaped display areas that are away from the obverse-side display area is less than a maximum vertical distance between the two arc-shaped display areas.

20 Claims, 14 Drawing Sheets

(56) References Cited

U.S. PATENT DOCUMENTS

| | | | |
|---|---|---|---|
| 11,165,896 B2 | 11/2021 | Kim | |
| 2008/0108340 A1* | 5/2008 | Karstens | H04M 1/72454 |
| | | | 455/418 |
| 2011/0063458 A1* | 3/2011 | Washisu | H04N 5/23248 |
| | | | 348/208.2 |
| 2013/0002133 A1 | 1/2013 | Jin et al. | |
| 2013/0076649 A1* | 3/2013 | Myers | G06F 1/1643 |
| | | | 345/173 |
| 2014/0198436 A1 | 7/2014 | Lim et al. | |
| 2014/0370938 A1* | 12/2014 | Lee | H04M 1/0266 |
| | | | 455/566 |
| 2015/0160699 A1 | 6/2015 | Choi et al. | |
| 2015/0274572 A1* | 10/2015 | Wada | C03B 23/0305 |
| | | | 65/106 |
| 2016/0234362 A1* | 8/2016 | Moon | H04M 1/185 |
| 2016/0299527 A1* | 10/2016 | Kwak | G06F 1/1626 |
| 2017/0180533 A1 | 6/2017 | Chen | |
| 2018/0039368 A1* | 2/2018 | Choi | G06F 1/3262 |
| 2018/0114474 A1* | 4/2018 | Powell | G02F 1/133526 |
| 2018/0183912 A1* | 6/2018 | Lim | H03K 17/962 |
| 2018/0275719 A1 | 9/2018 | Kwak et al. | |
| 2018/0341522 A1* | 11/2018 | Bai | G06F 11/3433 |
| 2018/0345132 A1* | 12/2018 | Kurihara | A63F 13/25 |
| 2019/0383471 A1 | 12/2019 | Lin et al. | |
| 2021/0109623 A1* | 4/2021 | Bae | G06F 1/3265 |

FOREIGN PATENT DOCUMENTS

| | | |
|---|---|---|
| CN | 104993855 A | 10/2015 |
| CN | 105049606 A | 11/2015 |
| CN | 105100470 A | 11/2015 |
| CN | 106055027 A | 10/2016 |
| CN | 106385474 A | 2/2017 |
| CN | 106602220 A | 4/2017 |
| CN | 102855821 B | 5/2017 |
| CN | 106791072 A | 5/2017 |
| CN | 106850024 A | 6/2017 |
| CN | 106850881 A | 6/2017 |
| CN | 206594964 U | 10/2017 |
| CN | 107342464 A | 11/2017 |
| CN | 107508624 A | 12/2017 |
| CN | 107678674 A | 2/2018 |
| CN | 207070119 U | 3/2018 |
| EP | 3079033 A1 | 10/2016 |
| EP | 3246806 A1 | 11/2017 |
| KR | 20130007311 A | 1/2013 |

* cited by examiner

MOBILE TERMINAL

CROSS-REFERENCE TO RELATED APPLICATIONS

This application is a U.S. National Stage of International Patent Application No. PCT/CN2019/076907 filed on Mar. 5, 2019, which claims priority to Chinese Patent Application No. 201810516864.7 filed on May 25, 2018 and International Patent Application No. PCT/CN2018/097289 filed on Jul. 26, 2018. All of the aforementioned applications are hereby incorporated by reference in their entireties.

TECHNICAL FIELD

This application relates to the field of communications technologies, and in particular, to a mobile terminal.

BACKGROUND

The development of smartphones in recent years has resulted in a larger screen and a higher screen-to-body ratio. To further increase the screen-to-body ratio, some arc-shaped screens emerge in the prior art. Such an arc-shaped screen partially extends to a side frame of a mobile phone, squeezing a position at which a key is disposed on the side frame. Moreover, when the arc-shaped screen is used, to enable the arc-shaped screen to participate in display as well, a radian of the arc-shaped screen is also very large. Consequently, a display area of a plane on an obverse side is relatively small. A side-face display area squeezes a size of the obverse-side display area, affecting a size of the obverse-side display area. In addition, in the prior art, an arc-shaped display area mainly uses the obverse-side display area. When a user places a terminal device horizontally during use, an operation on the terminal device is restricted to an operation on the obverse-side display area.

SUMMARY

This application provides a mobile terminal, to improve a use effect of the mobile terminal.

According to a first aspect, a mobile terminal is provided. The mobile terminal includes a middle frame, a display module, and a battery cover. The middle frame is a structure configured to fasten the display module and the battery cover. When the display module and the battery cover are fastened onto the middle frame, the display module is located on an obverse side of the middle frame, and the battery cover is located on a reverse side of the middle frame. The middle frame has a left-side wall and a right-side wall, and a first groove and a second groove are provided on each of the left-side wall and the right-side wall. The two first grooves are configured to fasten the display module, and the two second grooves are configured to fasten the battery cover. When the display module is assembled to the middle frame, two ends of the display module are respectively disposed in the first grooves; and when the battery cover is assembled to the middle frame, two ends of the battery cover are respectively disposed in the second grooves. The display module is an arc-shaped display module. For convenience of description, a display area of the display module is divided into an obverse-side display area and arc-shaped display areas. There are two arc-shaped display areas, which are respectively arranged on two sides of the obverse-side display area. To improve a display effect of the mobile terminal, in this application, the arc-shaped display areas of the display module are improved. When the arc-shaped display areas are disposed, indent surfaces of the two arc-shaped display areas are disposed opposite to each other, and each arc-shaped display area encloses at least a part of a side wall of the middle frame. In addition, a vertical distance between end portions that are of the two arc-shaped display areas and that are away from the obverse-side display area is less than a maximum vertical distance between the two arc-shaped display areas, so that the arc-shaped display areas enclose a widest part of the entire middle frame. According to the foregoing technical solution, the first groove and the second groove share a groove wall. This improves isolation between a battery and the display module, and improves security of the display module. The display module encloses a widest position of the middle frame, so that the arc-shaped display areas have sufficient sizes to display independently. In addition, because the arc-shaped display areas have sufficient space, relatively large bends may be used at positions at which the arc-shaped display areas are connected to the obverse-side display area. This reduces transition at connections between the arc-shaped display areas and the obverse-side display area, so that a width of the obverse-side display area is approximately equal to a width of the mobile terminal, thereby improving a display effect of the entire mobile terminal.

When the arc-shaped display areas are specifically disposed, the arc-shaped display areas partially enclose the middle frame in a thickness direction of the mobile terminal. In other words, a thickness of the arc-shaped display areas is less than a thickness of the mobile terminal.

When the middle frame is specifically disposed, the middle frame includes a middle frame body and auxiliary fastening blocks that respectively correspond to the arc-shaped display areas. The middle frame body includes two oppositely sloping fastening planes, where the two fastening planes are arranged in a "splayed" shape. The auxiliary fastening blocks are respectively fastened onto the fastening planes. The second grooves and the shared parts of side walls are disposed on the middle frame body. The first grooves are located on the auxiliary fastening blocks. During assembly, the auxiliary fastening blocks are first assembled to the display module, and then the auxiliary fastening blocks are assembled to the middle frame body. Because the sloping fastening planes are used, the auxiliary fastening blocks and the middle frame body can be conveniently spliced by using an adhesive, and can be further conveniently fastened by using screws.

The display module may be different display modules. In a specific implementation solution, the display module includes a flexible display screen, a touch panel stacked on the flexible display screen, and a protection cover stacked on the touch panel. The flexible display screen is an organic electroluminescent display screen and has relatively good flexibility.

Different manners may be used to specifically dispose the protection cover. For example, the protection cover is an equal-thickness transparent cover plate. In this case, portions of the transparent cover plate that protect the obverse-side display area and the arc-shaped display areas on the flexible display screen are of a same thickness. Alternatively, the protection cover may be disposed in an unequal-thickness manner. In this case, the protection cover includes a first portion and a second portion, where the first portion is located on the obverse-side display area, the second portion is located on the arc-shaped display area, and a thickness of the second portion is greater than a thickness of the first portion. In addition, during specific disposal, the second portion is disposed in a gradual changing manner. In other words, the thickness of the second portion gradually decreases from a middle part to two ends, so that the second portion has a greatest thickness at a widest position of the mobile terminal, thereby further improving a protection effect on the flexible display screen.

In addition to the foregoing components, the mobile terminal further includes pressure-sensitive components corresponding to the arc-shaped display areas, and an AI chip. The AI chip is configured to control working of the display module. Specifically, the AI chip is configured to: when pressure detected by the pressure-sensitive components does not exceed a first specified value, control the display module to stay in a sleep state; or when pressure detected by the pressure-sensitive components exceeds a first specified value, control the display module to start. That the display module starts specifically includes: when the pressure detected by the pressure-sensitive components exceeds the first specified value, controlling the touch panel to start to work; and then determining, based on whether the touch panel receives a touch signal, to light the flexible display screen.

In addition, the AI chip is further configured to: when pressure detected by any one of the plurality of pressure-sensitive components exceeds a second specified value, control one of the arc-shaped display areas to display volume touch keys or game touch keys. The volume touch keys and the game touch keys are all controlled through touch, and a principle of the touch key is the same as a principle of a touch key displayed on a touchscreen of an existing mobile terminal.

There are two game touch keys, and the game touch keys are respectively located at two ends of one of the arc-shaped display areas. This is convenient for playing games when the mobile terminal is placed horizontally.

Preferably, to improve a use effect of the entire mobile terminal, the mobile terminal in this application further includes a plurality of components, pressure-sensitive components corresponding to the arc-shaped display areas, and an AI chip. The AI chip determines, by using pressure detected by the pressure-sensitive components, a position at which the mobile terminal is held; and controls a component of the plurality of components that is not held to work. In this way, the component of the mobile terminal that is not held is enabled to work, to prevent a working effect of the component from being affected by a posture in which a user holds the mobile terminal. The plurality of components are disposed at different positions of the mobile terminal.

The foregoing components may be different components, which may be specifically one or more of an audio monitoring unit, an antenna, a speaker, a vibration component, and a heat dissipator, so that a working effect of the components in the entire mobile terminal can be improved.

In another implementation solution, the AI chip may further determine a posture of the mobile terminal based on pressure detected by the plurality of pressure-sensitive components, and when determining that the mobile terminal is held in a left hand or held in a right hand, control the mobile terminal to stay in a corresponding display mode.

DESCRIPTION OF EMBODIMENTS

To make the objectives, technical solutions, and advantages of this application clearer, the following further describes this application in detail with reference to the accompanying drawings.

To facilitate understanding of a mobile terminal provided in embodiments of this application, the following first describes the mobile terminal provided in the embodiments of this application. The mobile terminal may be a common mobile terminal such as a mobile phone or a tablet computer, or certainly may be a notebook computer or the like. The following provides detailed descriptions by using an example in which the mobile terminal is a mobile phone.

Figure 1:
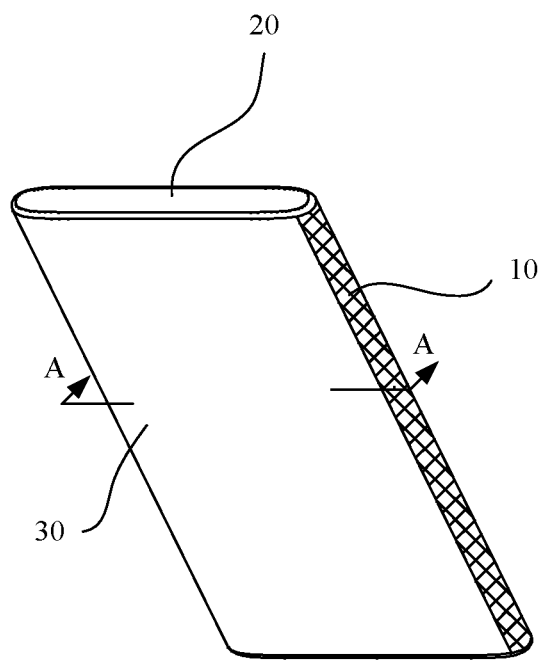
FIG. 1 is a schematic structural diagram of a mobile terminal according to an embodiment of this application.
Figure 2:
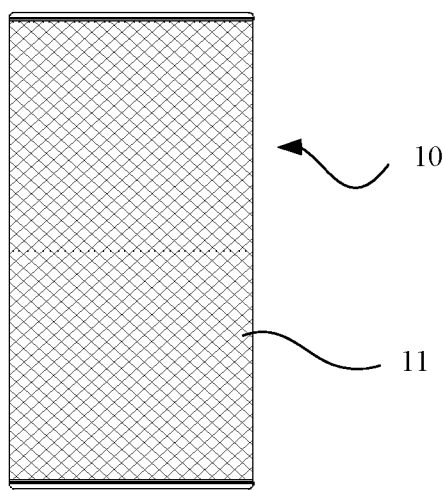
FIG. 2 is a front view of a mobile terminal according to an embodiment of this application.
Figure 3:
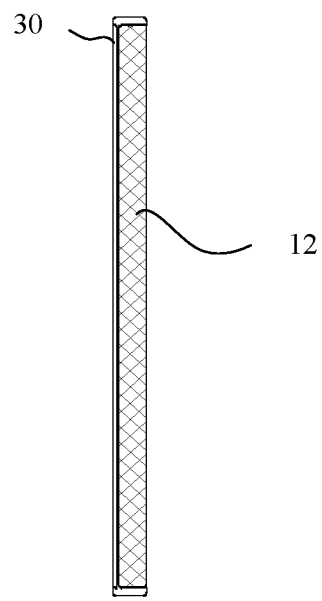
FIG. 3 is a side view of a mobile terminal according to an embodiment of this application.
Figure 4:
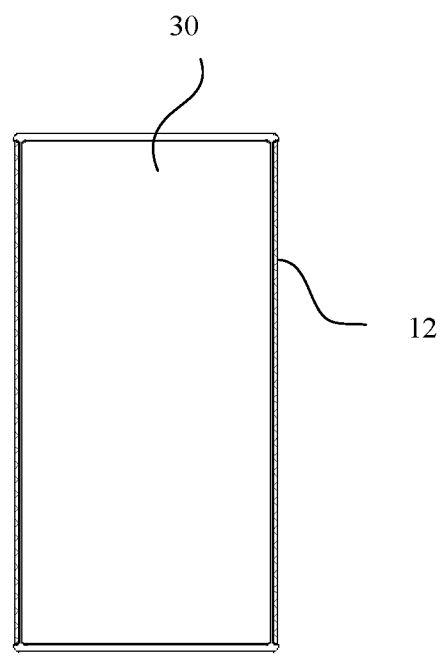
FIG. 4 is a rear view of a mobile terminal according to an embodiment of this application.

First refer to FIG. 1. FIG. 1 is a schematic structural diagram of a mobile terminal according to this application. The mobile terminal includes a middle frame 20, a display module 10, and a battery cover 30. The middle frame 20 functions as a supporting carrier and supports the display module 10 and the battery cover 30. In addition, after the battery cover 30 and the display module 10 are fastened onto the middle frame 20, as shown in FIG. 2 to FIG. 4, the display module 10 and the battery cover 30 are respectively arranged on an obverse side and a reverse side of the middle frame 20. In addition, when the display module 10 is disposed on the middle frame 20, the display module 10 further covers a part of a side wall of the middle frame 20. The following describes in detail structures of several components of the mobile terminal provided in this embodiment of this application.

Figure 5:
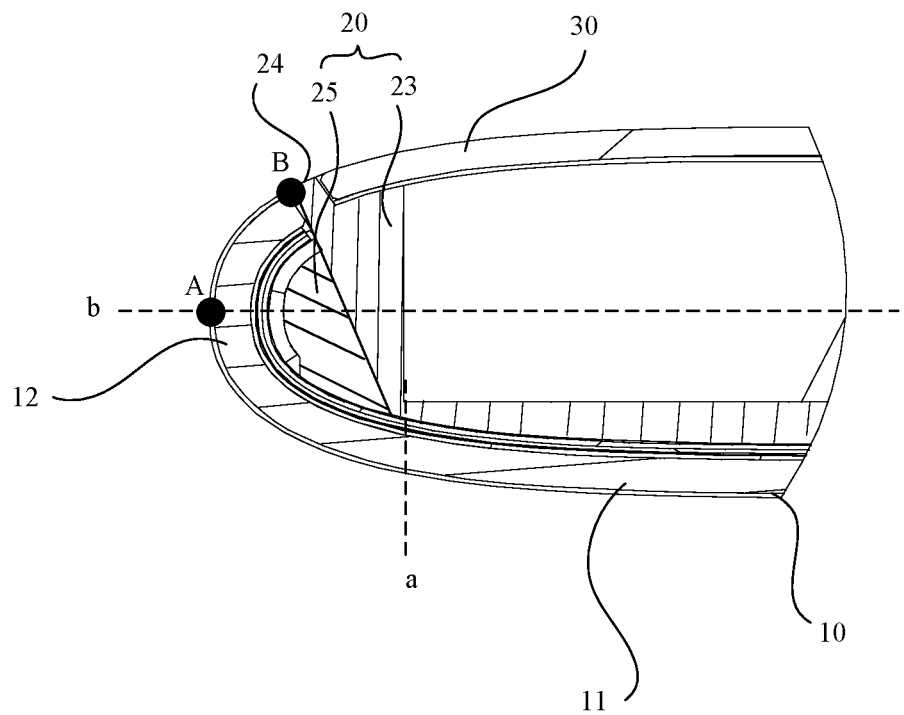
FIG. 5 is a local schematic diagram of a section at a position A-A in FIG. 1.
Figure 6:
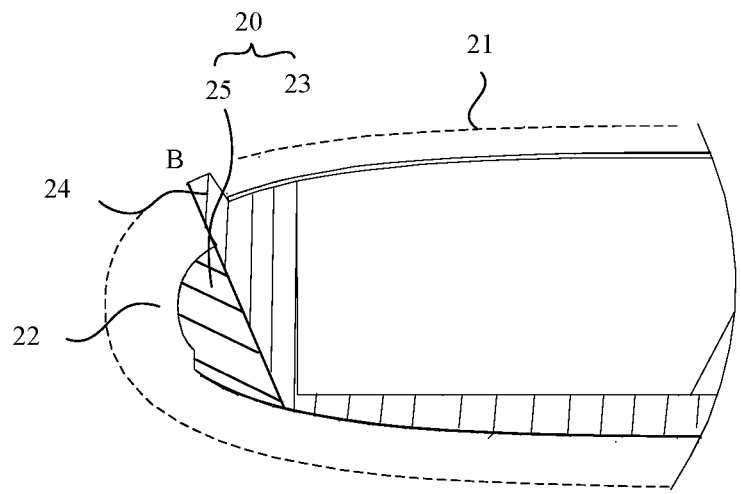
FIG. 6 is a schematic structural diagram of a middle frame according to an embodiment of this application.

Also refer to FIG. 5 and FIG. 6. FIG. 5 is a schematic cross-section view of the mobile terminal, and FIG. 6 is a schematic structural diagram of the middle frame 20. The middle frame 20 provided in this embodiment of this application includes an obverse side, a reverse side, a left-side wall, and a right-side wall. The obverse side of the middle frame 20 is a side directly facing a user when the user normally handholds the mobile terminal, the reverse side is a side opposite to the obverse side, and the left-side wall and the right-side wall are respectively arranged on two sides of the obverse side. The left-side wall and the right-side wall are side walls enclosed by the display module 10. Only one left-side wall is shown in the structure of the middle frame 20 shown in FIG. 6. It can be learned from FIG. 6 that a first groove 22 and a second groove 21 that are adjacent to each other are disposed on the left-side wall, the first groove 22 and the second groove 21 are respectively arranged on two sides of the side wall, and the first groove 22 and the second groove 21 share a groove wall 24. In the structure shown in FIG. 6, the groove wall 24 projects outward, and the groove wall 24 slopes upward by using a direction in which the middle frame 20 in FIG. 6 is placed as a reference direction. In addition, a groove bottom of the first groove 22 is an arc-shaped surface. The arc-shaped surface is intended to cooperate with bent areas at two ends of the display module 10 and is used to limit an arc-shaped bend of the display module 10. Similarly, a groove bottom of the second groove 21 is also an arc-shaped surface, to cooperate with an arc-shaped bend of the battery cover 30.

When the structure of the middle frame 20 is specifically disposed, except using an integrated structure, the middle frame may alternatively use the structure shown in FIG. 6. The middle frame 20 includes two parts, which are respectively a middle frame body 23 and auxiliary fastening blocks 25. As shown in FIG. 6, the middle frame body 23 includes two oppositely sloping fastening planes. The two fastening planes slope toward a frame body of the middle frame, and are arranged in a "splayed" shape. The two auxiliary fastening blocks 25 are respectively fastened onto the fastening planes. For the first groove 22 and the second groove 21 on the middle frame, the second groove 21 and the shared part of the side wall are disposed on the middle frame body 23, and the first groove 22 is located on the auxiliary fastening block 25. During assembly, because of the arc-shaped bend of the display module, the auxiliary fastening blocks 25 are first assembled to the display module, and then the auxiliary fastening blocks 25 are assembled to the middle frame body 23. When the frame body 23 and the auxiliary fastening blocks 25 are assembled, because the fastening planes are disposed in a sloping manner, a surface that is of the auxiliary fastening block 25 and that cooperates with the middle frame body 23 is also a sloping surface. Therefore, the auxiliary fastening blocks 25 can be conveniently fit onto the fastening planes. In addition, it can be learned from FIG. 6 that because of the sloping fastening planes, when the auxiliary fastening blocks 25 are further fastened by using screws or bolts, the screws or the bolts may also be disposed in a sloping manner. When the bolts or the screws are fastened by using a tool, there is relatively large space in the middle frame, facilitating fastening of the bolts or the screws.

Also refer to FIG. 5. FIG. 5 shows a structure in which the battery cover 30 and the display module 10 are fastened onto the middle frame 20. FIG. 5 shows only a manner in which the display module 10 and the battery cover 30 are fastened onto one side wall of the middle frame 20. On the other side of the middle frame 20, the display module 10 and the battery cover 30 may also be connected in the same manner. The following describes a connection of the display module 10 and the battery cover 30 to the middle frame 20 by using the structure shown in FIG. 5 as an example. As shown in FIG. 5, the display module 10 and the battery cover 30 are respectively arranged on the two sides of the middle frame 20, and specifically, should be respectively arranged on two sides of the groove wall 24 shared by the first groove 22 and the second groove 21. During assembly, the battery cover 30 covers the middle frame 20, and the battery cover 30 is partially located on the second groove 21. When the display module 10 is assembled to the middle frame 20, an edge of the display module 10 is partially located in the first groove 22. In addition, the battery cover 30 and the display module 10 are separated by using the shared groove wall 24. The groove wall 24 separates the battery cover 30 and the display module 10, to prevent the battery cover 30 from colliding with the display module 10 when the battery cover 30 is removed, thereby improving security of the display module 10. Moreover, it can be learned from FIG. 5 that the groove wall 24 may be considered as a component that blocks up an end portion of the display module 10, the groove wall 24 and a structure of a top end and a bottom end (using a direction in which the mobile terminal is placed in FIG. 2 as a reference direction) of the middle frame 20 shown in FIG. 2 form a frame structure that encircles the display module 10, so that edges of the entire display module 10 can be protected, thereby improving security of the display module 10.

When the display module 10 is assembled into the first groove 22, an area that is of a display area of the display module 10 and that corresponds to the first groove 22 is an arc-shaped display area 12. A bending radian of the arc-shaped display area 12 is approximately equal to a bending radian of a bottom surface of the first groove 22, so that a bend (a structure corresponding to the arc-shaped display area 12) on the edge of the display module 10 can be fit into the first groove 22. In addition to the foregoing arc-shaped display area 12, the display area of the display module 10 further includes an obverse-side display area 11. The obverse-side display area 11 is located in the middle, and two arc-shaped display areas 12 are respectively located on two sides of the obverse-side display area 11. To distinguish between the arc-shaped display areas 12 and the obverse-side display area 11 in this embodiment of this application, an auxiliary line a is provided for division in FIG. 5. Display areas located on two sides of the auxiliary line are respectively the obverse-side display area 11 and the arc-shaped display area 12. Also refer to structures shown in FIG. 2 and FIG. 3. FIG. 2 shows the obverse-side display area 11, and FIG. 3 shows the arc-shaped display area 12.

Continue to refer to FIG. 5. To prevent the obverse-side display area from being affected by an excessively large radian of the arc-shaped display area 12, in this embodiment of this application, an arc-shaped bend of the arc-shaped display area 12 is limited. In this embodiment of this application, indent surfaces of the two arc-shaped display areas 12 are disposed opposite to each other, and each arc-shaped display area 12 encloses at least a part of a side wall of the middle frame 20. In addition, a vertical distance between end portions that are of the two arc-shaped display areas 12 and that are away from the obverse-side display area 11 is less than a maximum vertical distance between the two arc-shaped display areas 12, so that the arc-shaped display areas 12 enclose a widest part of the entire middle frame 20. The structure shown in FIG. 5 is used as an example, and it can be learned that a farthest point of the arc-shaped display area 12 is a position indicated by a point A in FIG. 5, and an end that is of the arc-shaped display area 12 and that is away from the obverse-side display area 11 is a position indicated by a point B in FIG. 5. It can be learned from FIG. 5 that a farthest distance between the two arc-shaped display areas 12 is at a position with a largest width of the entire mobile terminal, and the arc-shaped display areas 12 enclose the entire mobile terminal until the position with the largest width and are bent backward. During specific disposal, as shown in FIG. 5, the arc-shaped display area 12 goes beyond half a thickness of the entire mobile terminal, and the arc-shaped display area 12 does not go beyond the thickness of the entire mobile terminal, where an auxiliary line b indicates a position corresponding to half the thickness of the mobile terminal. Also refer to FIG. 4. It can be learned from a rear view of the mobile terminal shown in FIG. 4, the arc-shaped display areas 12 can be partially seen when the mobile terminal is seen from a reverse side.

It can be learned from the foregoing descriptions that the display module 10 encloses a widest position of the middle frame 20, and the arc-shaped display areas 12 have sufficient sizes to display independently. In addition, because the arc-shaped display areas 12 have sufficient space, relatively large bends may be used at positions at which the arc-shaped display areas 12 are connected to the obverse-side display area 11. This reduces transition at connections between the arc-shaped display areas 12 and the obverse-side display area 11, so that a width of the obverse-side display area 11 is approximately equal to a width of the mobile terminal, thereby improving a display effect of the entire mobile terminal.

Figure 7:
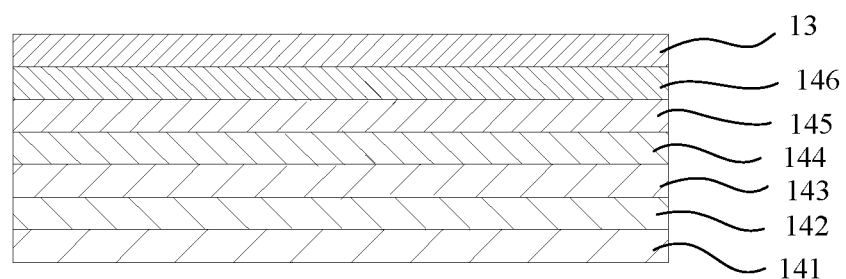
FIG. 7 is a schematic structural diagram of a display module according to an embodiment of this application.
Figure 8A:
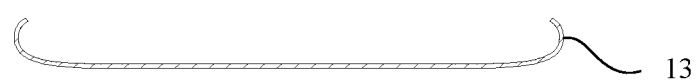
FIG. 8a to FIG. 8c are flowcharts of processing a display module according to an embodiment of this application.
Figure 8B:
Figure 8C:
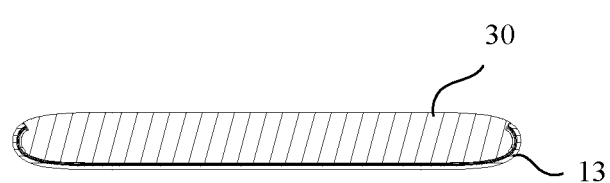

Also refer to FIG. 7. FIG. 7 shows a structure of the display module 10 according to this embodiment of this application. The display module 10 provided in this embodiment of this application includes a flexible display screen 142, a touch panel 145 stacked on the flexible display screen 142, and a protection cover 13 stacked on the touch panel 145. The flexible display screen 142 is an organic electroluminescent display screen and has relatively good flexibility. Refer to FIG. 7. For convenience of description, layer structures shown in FIG. 7 are described in sequence from bottom to top. A foam layer 141 is located at a lowest layer, and the foam layer 141 is configured to splice the display module 10 to the middle frame 20. A second lowest layer is the flexible display screen 142, a third lowest layer is a polarizer 143, a fourth lowest layer is an adhesive layer 144, a fifth lowest layer is the touch panel 145, a sixth lowest layer is an adhesive layer 146, and a seventh lowest layer is the protection cover 13. Also refer to FIG. 8a to FIG. 8c. FIG. 8a to FIG. 8c show a process of assembling the display module 10. First, the protection cover 13 is bent into a required shape, and then other structures of the display module 10 are bent and placed into the protection cover 13, so that the entire display module 10 forms a structure having bends at two ends. Finally, the entire display module 10 is assembled to and fastened onto the middle frame 20, to complete assembly of the entire display module 10.

Figure 9A:
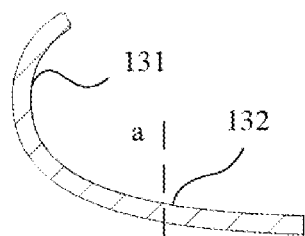
FIG. 9a and FIG. 9b are schematic structural diagrams of two transparent cover plates according to an embodiment of this application.
Figure 9B:
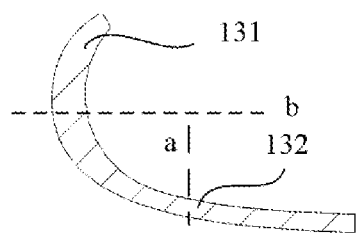

The protection cover 13 in the display module 10 may use different structures. For example, the protection cover 13 is an equal-thickness transparent cover plate. FIG. 9a shows a structure of a part of the transparent cover plate. For convenience of division, an auxiliary line a is added in FIG. 9a, where this auxiliary line a and the auxiliary line a in FIG. 5 are the same auxiliary line. Portions located on two sides of the auxiliary line a are respectively a first portion 132 and a second portion 131, and the first portion 132 and the second portion 131 respectively correspond to the obverse-side display area 11 and the arc-shaped display area 12 of the display module 10. It can be learned from the structure shown in FIG. 9a that portions of the transparent cover plate that protect the obverse-side display area 11 and the arc-shaped display area 12 on the flexible display screen 142 are of a same thickness. In addition, except the equal-thickness structure shown in FIG. 9a, the protection cover 13 may alternatively use an unequal-thickness structure shown in FIG. 9b. In this case, the protection cover 13 includes a first portion 132 and a second portion 131, which are also divided by using an auxiliary line a. Moreover, the first portion 132 is located on the obverse-side display area 11, and the second portion 131 is located on the arc-shaped display area 12. A thickness of the second portion 131 is greater than a thickness of the first portion 132. Continue to refer to FIG. 9b. An auxiliary line b in FIG. 9b and the auxiliary line b in FIG. 5 are the same auxiliary line. A position at which the auxiliary line b passes through the protection cover 13 is a thickest portion of the second portion 131, and a thickness of the second portion 131 gradually decreases in directions in which the second portion 131 extends toward two ends of the second portion 131 along the auxiliary line b, where the auxiliary line passes through a middle position of the second portion 131. In addition, the thickest position of the second portion 131 is located at a widest position of the entire mobile terminal. In other words, the thickest portion of the second portion 131 protects an area that is of the arc-shaped display area 12 and that is located on a lateral side of the mobile terminal, thereby improving security of the display module 10.

Figure 9C:
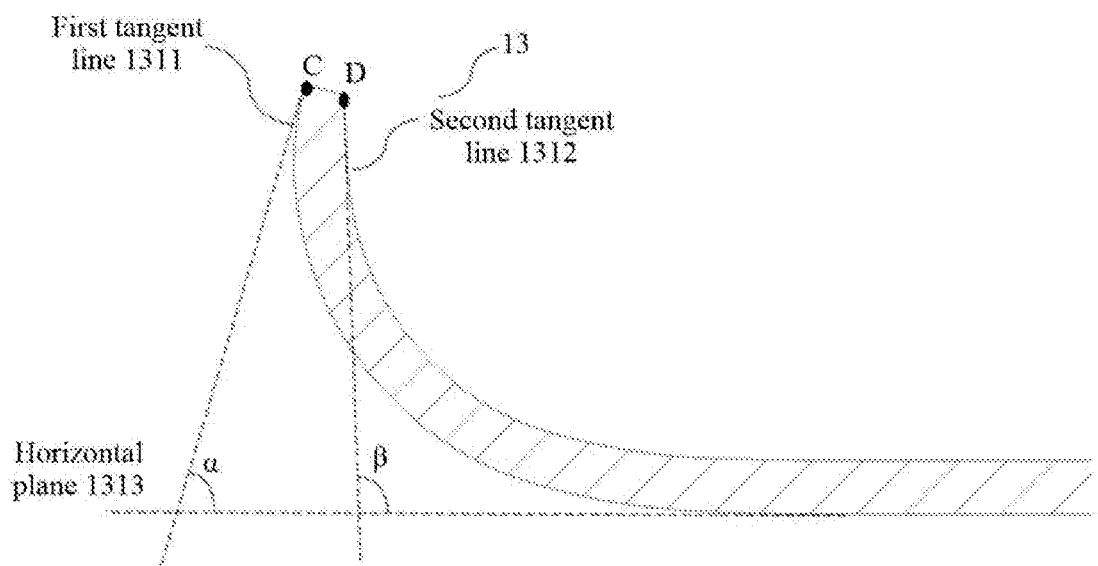
FIG. 9c is a schematic structural diagram of another transparent cover plate according to an embodiment of this application.

Optionally, FIG. 9c shows a partial structure of the protection cover 13. When the mobile terminal is placed on a table top (not shown in the figure) with the obverse-side display area facing downward, an angle α is formed between a horizontal plane 1313 in which the table top is located and a first tangent line 1311 that passes through an external endpoint C that is of the protection cover 13 and that is away from the obverse-side display area 11, where the angle α is less than 90°. In a thickness direction of protection cover 13, an internal endpoint D that is of the protection cover 13 and that is away from the obverse-side display area 11 is on the other side, opposite to the external endpoint C. An angle β is formed between a second tangent line 1312 that passes through the internal endpoint D and the horizontal plane 1313, where the angle β is greater than or equal to 90°. The protection cover 13 using the foregoing structure has an advantage of reducing engineering costs.

Figure 10A:
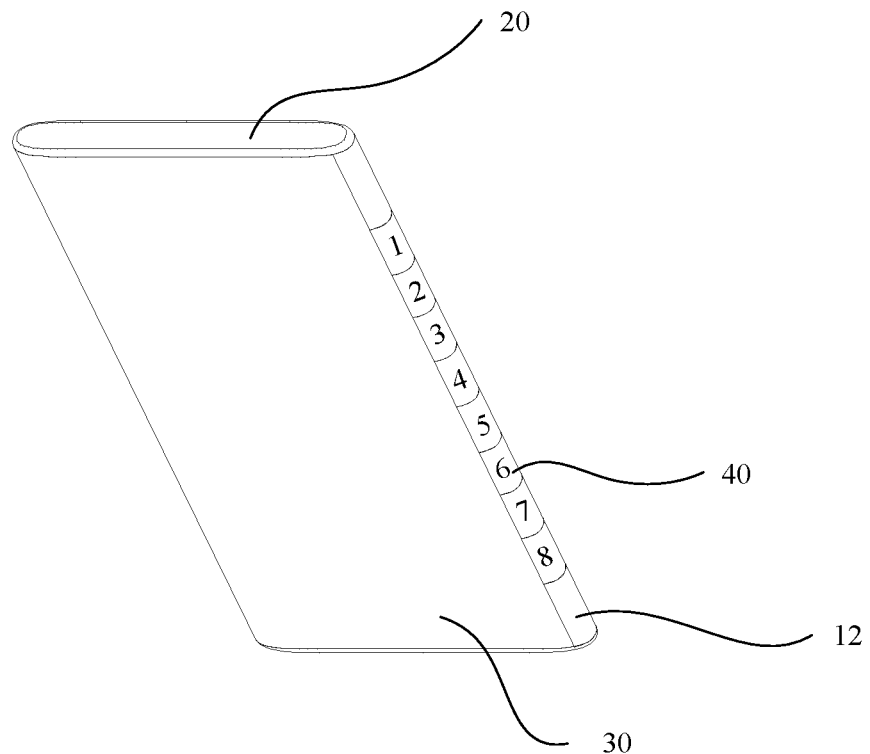
FIG. 10a to FIG. 10c are reference diagrams of a use status of an arc-shaped display area according to an embodiment of this application.
Figure 10B:
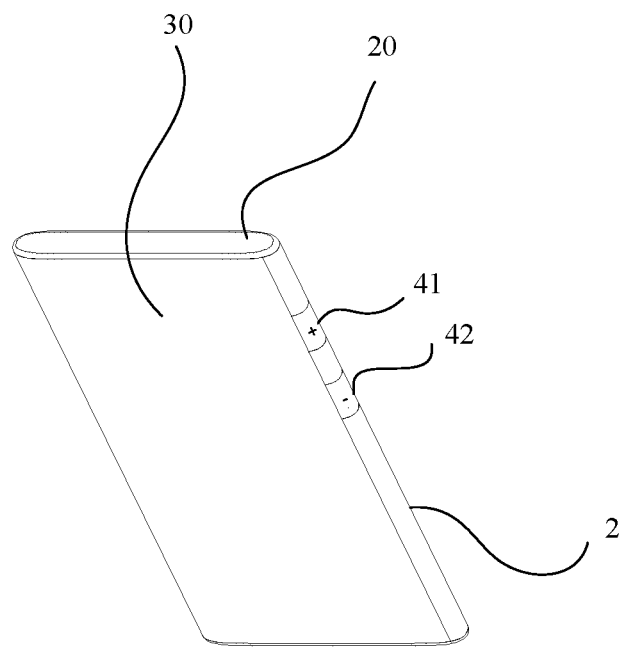
Figure 10C:
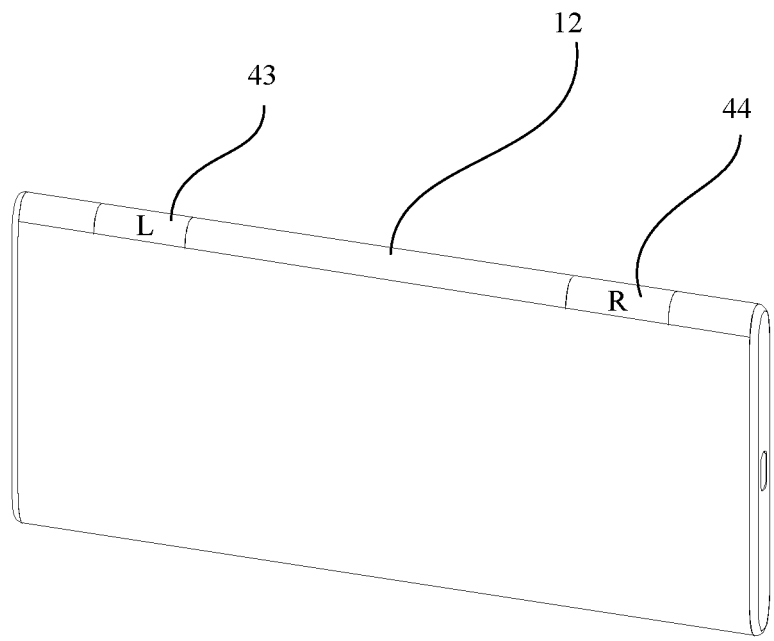

In the foregoing structure, the arc-shaped display area 12 of the display module 10 may be configured to display a touch key. FIG. 10a shows a touch key displayed in the arc-shaped display area 12. It can be learned from FIG. 10a that the touch key is disposed in a length direction of the mobile terminal, where the length direction of the mobile terminal is a length direction parallel to a side wall enclosed by the arc-shaped display area 12 of the display module 10. In FIG. 10a, the touch key 40 is a plurality of number touch keys, and a quantity is 8. The touch keys display characters 1 to 8 in sequence. In addition, except the foregoing number touch keys, the touch key may alternatively be another touch key. As shown in FIG. 10b, the touch key is volume touch keys 41 and 42, and a quantity is 2. One volume touch key 41 displays "+", and the other volume touch key 42 displays "−". A volume of the mobile terminal may be adjusted by using the volume touch keys 41 and 42. Moreover, a solution shown in FIG. 10c may be alternatively used. Two touch keys shown in FIG. 10c are game touch keys 43 and 44. The game touch keys 43 and 44 are respectively located at two ends of one of the arc-shaped display areas 12. This is suitable for finger control when a mobile phone is placed horizontally. The game touch keys 43 and 44 shown in FIG. 10*c* respectively display "R" and "L". Certainly, the game touch keys 43 and 44 may be further used as touch keys in other games. The two game touch keys 43 and 44 shown in FIG. 10*c* are respectively arranged at two ends of the arc-shaped display area 12 with a specific distance from the two ends of the arc-shaped display area 12, so that it is convenient for placing fingers on the two game touch keys 43 and 44.

It should be understood that a principle of the touch key in the foregoing embodiment is the same as a principle of a touch key in the prior art. Details are not described herein.

Continue to refer to FIG. 10*a* to FIG. 10*c*. In addition to the foregoing components, the mobile terminal further includes pressure-sensitive components (not shown in the figures) corresponding to the arc-shaped display areas 12 and an AI chip (not shown in the figures). The AI chip is configured to control working of the display module 10. Specifically, the AI chip is configured to: when pressure detected by the pressure-sensitive components does not exceed a first specified value, control the display module 10 to stay in a sleep state; or when pressure detected by the pressure-sensitive components exceeds a first specified value, control the display module 10 to start. That the display module 10 starts specifically includes: when the pressure detected by the pressure-sensitive components exceeds the first specified value, controlling the touch panel 145 to start to work; and then determining, through control on the touch panel 145, whether to light the flexible display screen 142. The pressure-sensitive components are disposed on the arc-shaped display areas 12. In this way, when a side wall of the mobile terminal is touched, the pressure-sensitive components may be used to detect pressure, to determine whether the display module 10 needs to be started. It should be understood that a principle of the foregoing pressure-sensitive components is the same as a principle of a pressure-sensitive component in a mobile phone in the prior art. Details are not described herein.

More preferably, the AI chip is further configured to: when pressure detected by any one of the plurality of pressure-sensitive components exceeds a second specified value, control one of the arc-shaped display areas 12 to display the volume touch keys or the game touch keys. In addition, when the game touch keys are specifically displayed, the game touch keys may be displayed at a position detected by the pressure-sensitive components, so that the game touch keys can better meet a habit of a user. Moreover, the volume touch keys may also be displayed in this manner. To be specific, the AI chip is configured to perform operation processing, to accurately locate an operation position of a user and control a volume at any position. This resolves a problem of inconvenience of operation on an existing physical volume key at a fixed position.

Refer to FIG. 11*a* to FIG. 15*b*, to improve a use effect of the entire mobile terminal, the mobile terminal in this application further includes a plurality of components, pressure-sensitive components (not shown in the figures) corresponding to the arc-shaped display areas 12, and an AI chip (not shown in the figures). The AI chip determines, by using pressure detected by the pressure-sensitive components, a position at which the mobile terminal is held; and controls a component of the plurality of components that is not held to work. In this way, the component of the mobile terminal that is not held is enabled to work, to prevent a working effect of the component from being affected by a posture in which a user holds the mobile terminal. The plurality of components are disposed at different positions of the mobile terminal. The foregoing components may be different components, which may be specifically one or more of an audio monitoring unit, an antenna, a speaker, a vibration component, and a heat dissipator, so that a working effect of the components in the entire mobile terminal can be improved. The following provides detailed descriptions with reference to specific accompanying drawings.

Figure 11A:
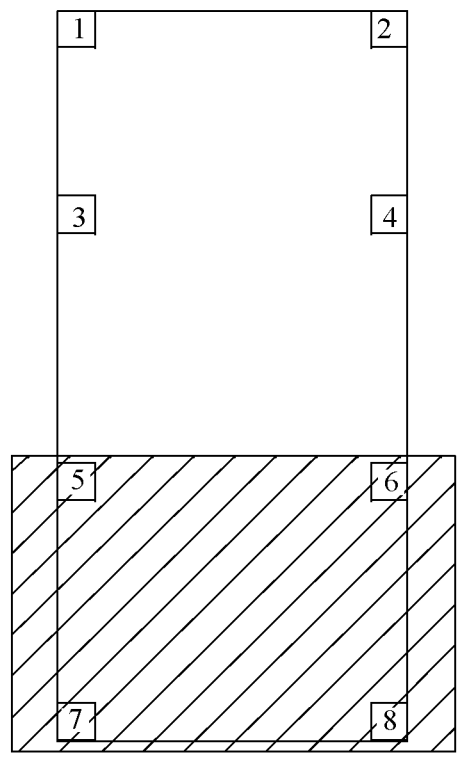
FIG. 11a to FIG. 11d are reference diagrams of a use status of a mobile terminal according to an embodiment of this application.
Figure 11B:
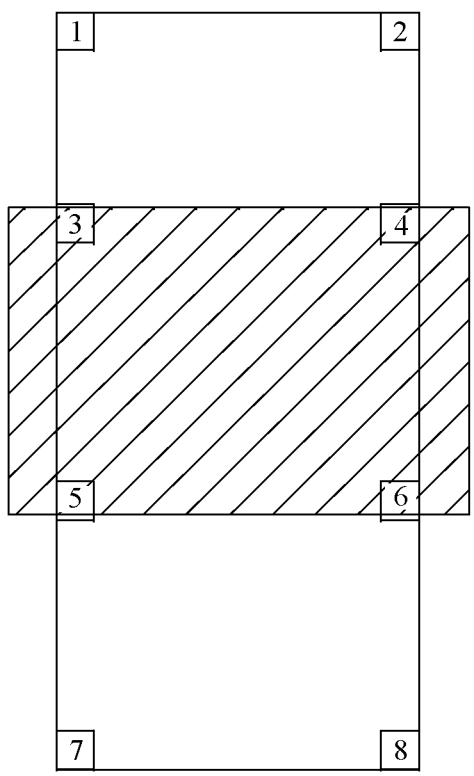
Figure 11C:
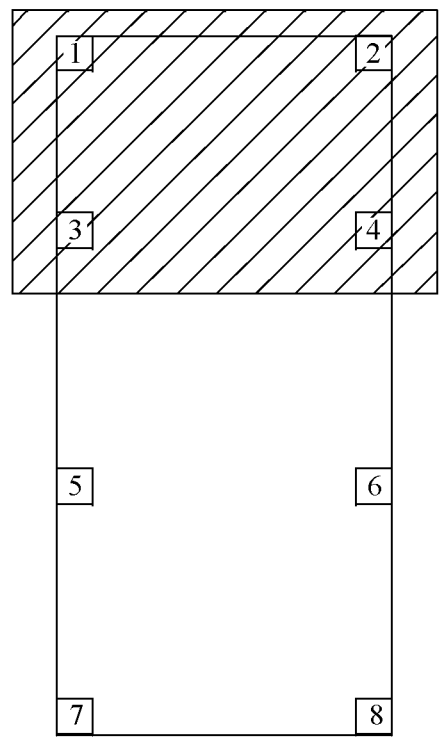
Figure 11D:
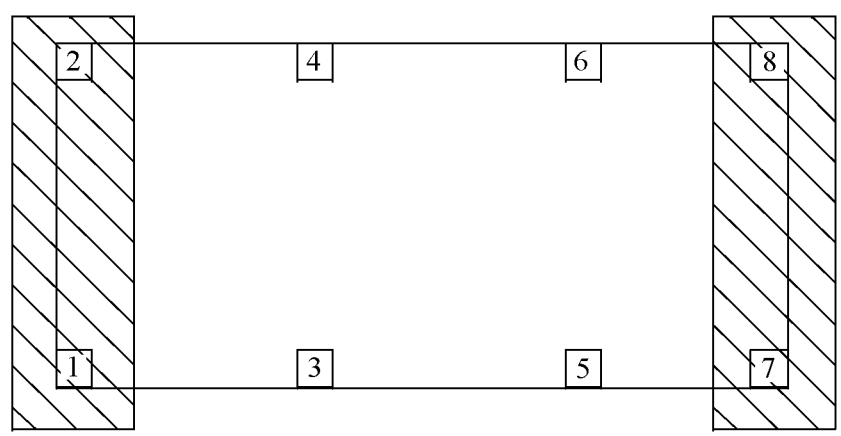

First, as shown in FIG. 11*a* to FIG. 11*d*, reference numerals 1 to 8 in the accompanying drawings respectively represent different antennas. It can be learned from FIG. 11*a* that the eight antennas are respectively disposed at four corners of the mobile terminal and four positions on the middle frame 20. Shadow areas in FIG. 11*a* to FIG. 11*d* represent positions of the mobile terminal that are held. During use, the touch panel 145 and the pressure-sensitive components are configured to recognize a manner in which a human hand holds a terminal device, and the AI chip is configured to perform operation processing, to select a most effective antenna group to work, thereby implementing a multi-antenna combination mode with low power consumption and low losses. Specifically, an antenna that is not held is selected to work. It can be learned from FIG. 11*a* that when antennas 5, 6, 7, and 8 are held, the AI chip controls antennas 1, 2, 3, and 4 to work. In FIG. 11*b*, when antennas 3, 4, 5, and 6 are held, the AI chip controls antennas 1, 2, 7, and 8 to work. It can be learned from FIG. 11*c* that when antennas 1, 2, 3, and 4 are held, the AI chip controls antennas 5, 6, 7, and 8 to work. It can be learned from FIG. 11*d* that when antennas 1, 2, 7, and 8 are held, the AI chip controls antennas 3, 4, 5, and 6 to work. It can be learned from the foregoing descriptions that when the AI chip controls an antenna that is not held to work, a working effect of the antenna can be effectively improved, a communication effect of the mobile terminal is improved, and power consumption of the mobile terminal is also reduced.

Figure 12A:
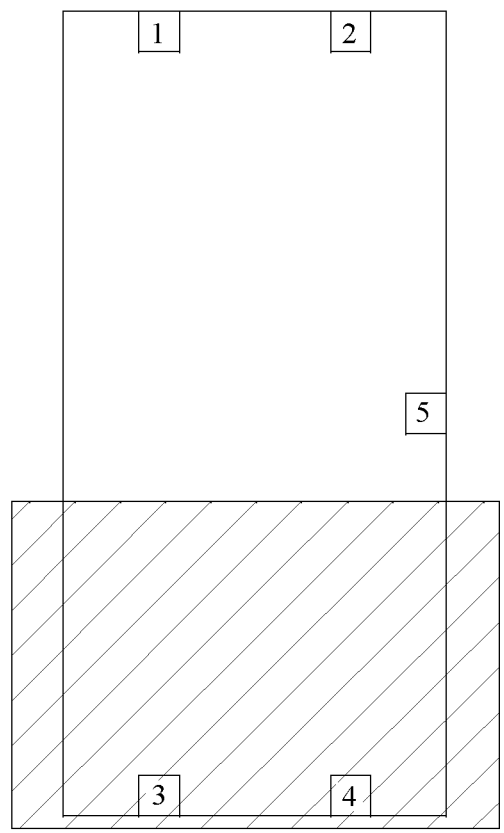
FIG. 12a and FIG. 12b are reference diagrams of a use status of a mobile terminal according to an embodiment of this application.
Figure 12B:
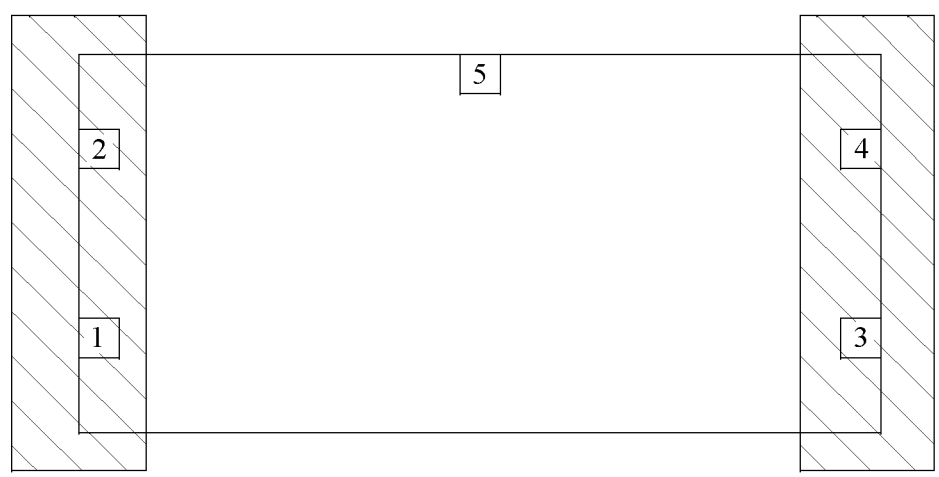

As shown in FIG. 12*a* and FIG. 12*b*, reference numerals 1 to 5 in the figures respectively represent different audio monitoring units. It can be learned from FIG. 12*a* that the five audio monitoring units are separately disposed at two ends of the mobile terminal and a middle position of the middle frame 20. Shadow areas in FIG. 12*a* and FIG. 12*b* represent positions of the mobile terminal that are held. During use, the touch panel 145 and the pressure-sensitive components are configured to recognize a manner in which a human hand holds the terminal device, and the AI chip is configured to perform operation processing, to select a most effective audio monitoring unit to work, thereby implementing an optimal audio monitoring effect with low power consumption. Specifically, an audio monitoring unit that is not held is selected to work. It can be learned from FIG. 12*a* that when audio monitoring units 3 and 4 are held, the AI chip controls audio monitoring units 1, 2, and 5 to work. In FIG. 12*b*, when the mobile terminal is placed horizontally, when audio monitoring units 1, 2, 3, and 4 are held, the AI chip controls an audio monitoring unit 5 to work. It can be learned from the foregoing descriptions that when the AI chip controls an audio monitoring unit that is not held to work, a working effect of the audio monitoring unit can be effectively improved, and power consumption of the mobile terminal is also reduced.

Figure 13A:
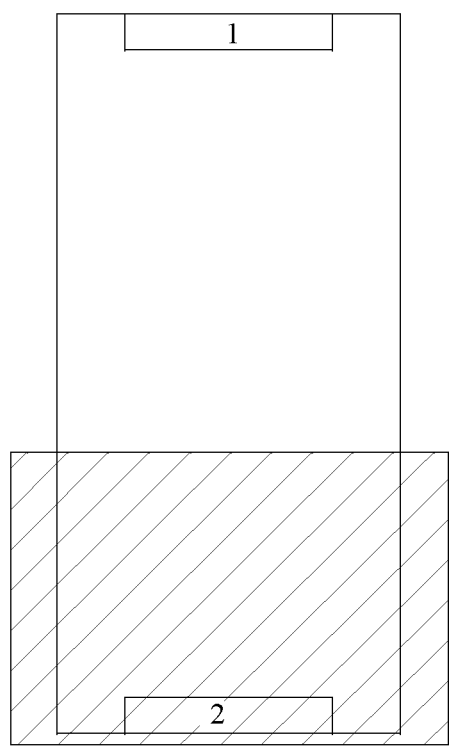
FIG. 13a and FIG. 13b are reference diagrams of a use status of a mobile terminal according to an embodiment of this application.
Figure 13B:
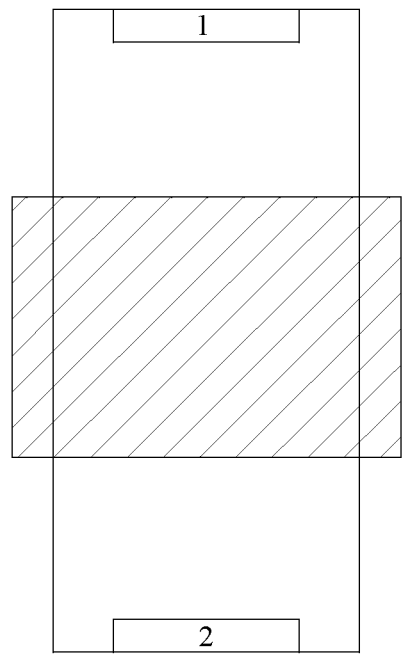

As shown in FIG. 13*a* and FIG. 13*b*, reference numerals 1 and 2 in the figures respectively represent different speakers. It can be learned from FIG. 13*a* that the two speakers are respectively disposed at two ends of the mobile terminal. Shadow areas in FIG. 13*a* and FIG. 13*b* represent positions of the mobile terminal that are held. During use, the touch panel 145 and the pressure-sensitive components are configured to recognize a manner in which a human hand holds the terminal device, and the AI chip is configured to perform operation processing, to select a most effective speaker group to work, thereby implementing an optimal working mode of a speaker group in a low power consumption state and achieving an effect of simulating a real scenario. For example, in a vehicle-mounted mode, a sound outlet hole of a speaker 2 faces downward. Therefore, the speaker 2 may be directly disabled, and a speaker 1 in a same direction as a screen is directly configured to produce sound. It can be learned from FIG. 13a that when a speaker 2 is held, the AI chip controls a speaker 1 to work. In FIG. 13b, when a speaker 1 and a speaker 2 are not held, the AI chip controls the speaker 1 and the speaker 2 to work. It can be learned from the foregoing descriptions that when the AI chip controls a speaker that is not held to work, a working effect of the speaker can be effectively improved, and power consumption of the mobile terminal is also reduced.

Figure 14A:
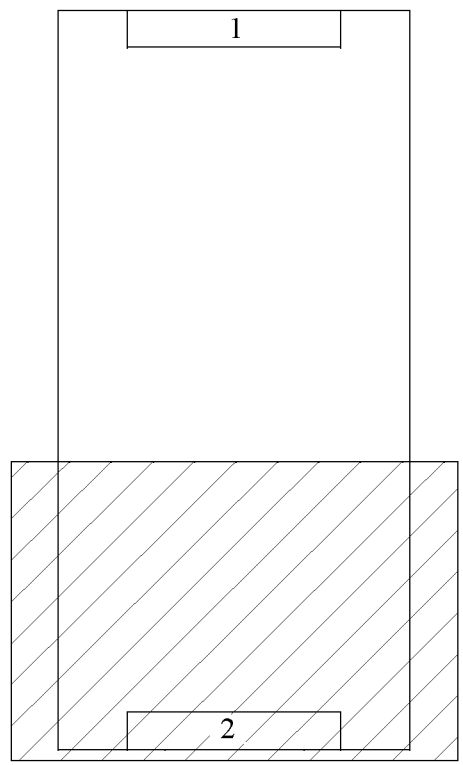
FIG. 14a and FIG. 14b are reference diagrams of a use status of a mobile terminal according to an embodiment of this application.
Figure 14B:
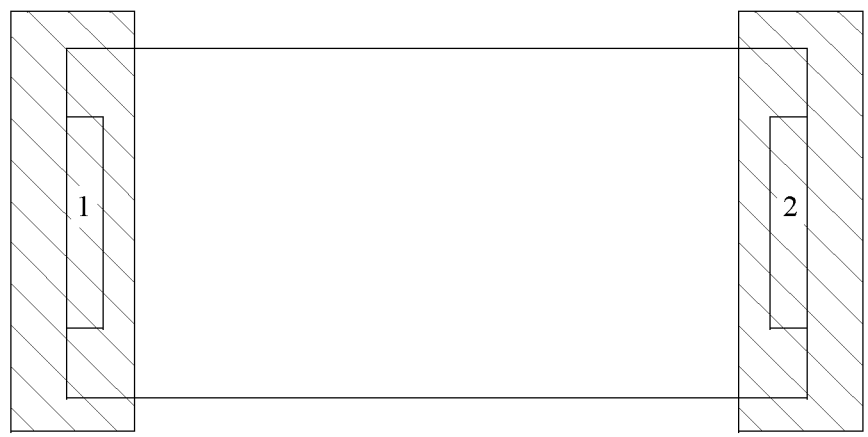

As shown in FIG. 14a and FIG. 14b, reference numerals 1 and 2 in the figures respectively represent different vibration components. It can be learned from FIG. 14a that the two vibration components are respectively disposed at two ends of the mobile terminal. Shadow areas in FIG. 14a and FIG. 14b represent positions of the mobile terminal that are held. During use, the touch panel 145 and the pressure-sensitive components are configured to recognize a manner in which a human hand holds the terminal device, to select a most proper working mode (including vibration amplitude and a vibration direction) of a vibration component group, thereby achieving an effect of precisely simulating a real scenario in a low power consumption state. It can be learned from FIG. 14a that when a vibration component 2 is held, the AI chip controls a vibration component 1 to work. In FIG. 14b, when the mobile terminal is placed horizontally, and vibration components 1 and 2 are not held, the mobile terminal is controlled to vibrate at a proper frequency and proper amplitude.

Figure 15A:
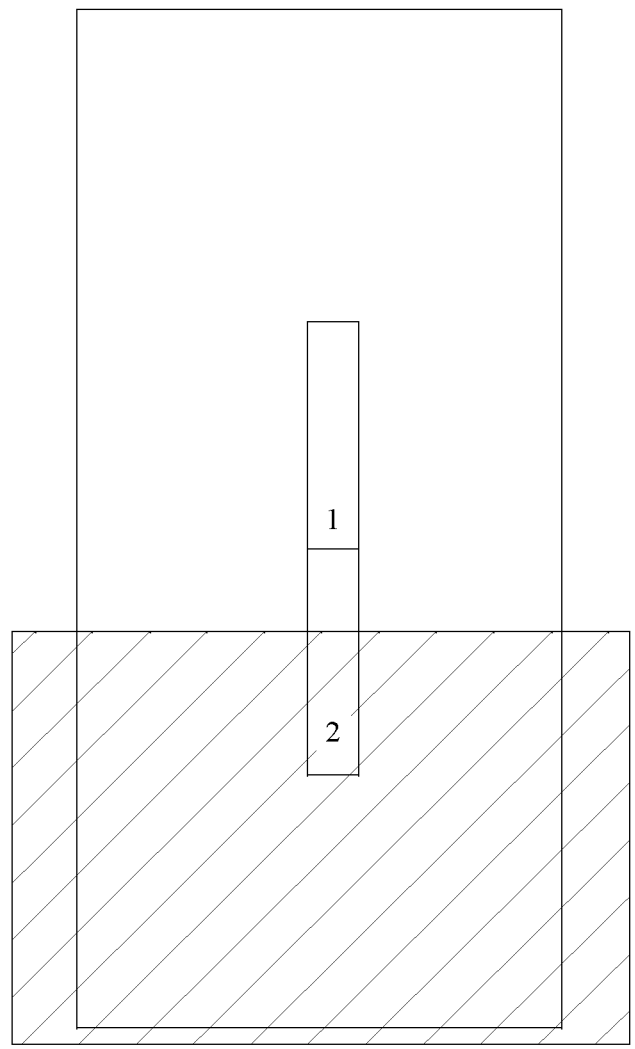
FIG. 15a and FIG. 15b are reference diagrams of a use status of a mobile terminal according to an embodiment of this application.
Figure 15B:
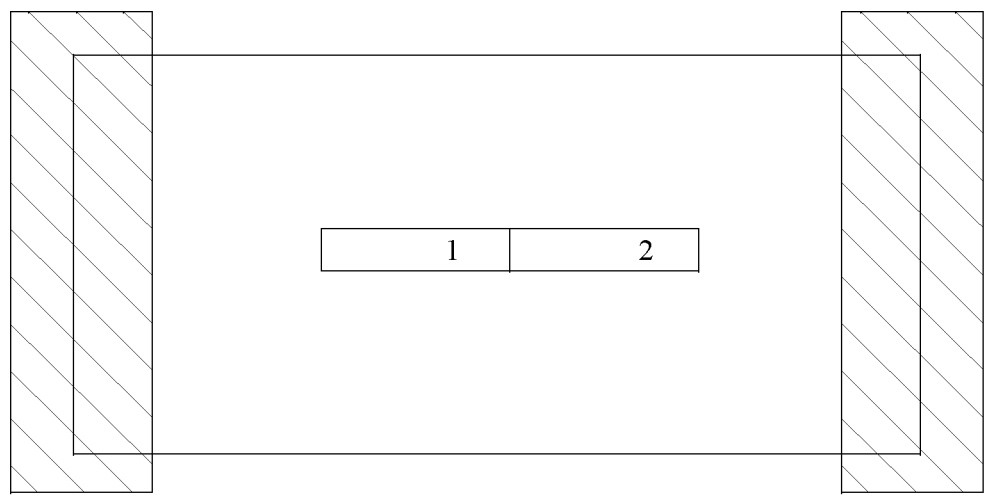

As shown in FIG. 15a and FIG. 15b, reference numerals 1 and 2 in the figures respectively represent different heat pipes. It can be learned from FIG. 15a that the two heat pipes are respectively disposed at middle positions of the mobile terminal. Shadow areas in FIG. 15a and FIG. 15b represent positions of the mobile terminal that are held. During use, the touch panel 145 and the pressure-sensitive components are configured to recognize a manner in which a human hand holds the terminal device, to precisely select a most proper working mode of a heat dissipator to aggregate heat to an area not touched by a user, so that user experience is not affected in a large power consumption scenario. It can be learned from FIG. 15a that when a heat pipe 2 is held, the AI chip controls a heat pipe 1 to work. In FIG. 15b, when the mobile terminal is placed horizontally, two ends of the mobile terminal are held, and a heat pipe 1 and a heat pipe 2 are not held, the heap pipe 1 and the heat pipe 2 may be controlled to dissipate heat.

It can be learned from the foregoing descriptions that through cooperation between the AI chip and the pressure-sensitive components, working effects of the components can be improved and power consumption can be reduced. It should be understood that FIG. 12a to FIG. 15b each show only a control manner of a single component. In the mobile terminal provided in this embodiment of this application, a manner in which a plurality of components are combined may be alternatively used. For example, the several components such as the audio monitoring unit, the antenna, the speaker, the vibration component, and the heat dissipator may be combined randomly. Several examples are listed below: the audio monitoring unit and the antenna; the speaker, the vibration component, and the heat dissipator; the antenna, the audio monitoring unit, and the vibration component; and the like. A form of any arrangement and combination may be applied to the embodiments of this application.

Moreover, in addition to the foregoing control operations, the AI chip may further determine a posture of the mobile terminal based on the pressure detected by the plurality of pressure-sensitive components, and when determining that the mobile terminal is held in a left hand or held in a right hand, control the mobile terminal to stay in a corresponding display mode.

It can be learned from the foregoing descriptions that in the mobile terminal provided in this embodiment of this application, a disposal manner of the display module may be used to improve the display effect, and the disposed pressure-sensitive components and AI chip may be configured to improve the working effects of the components in the mobile terminal.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An electronic device comprising:
    a middle frame comprising:
        an obverse side;
        a reverse side;
        a left-side wall coupling the obverse side and the reverse side; and
        a right-side wall coupling the obverse side and the reverse side;
    an obverse-side display area positioned on the obverse side;
    a battery cover positioned on the reverse side;
    a left-side display area positioned on the left-side wall;
    a right-side display area positioned on the right-side wall;
    pressure-sensitive components configured to detect a first pressure; and
    a processor coupled to the obverse-side display area, the left-side display area, the right-side display area, and the pressure-sensitive components and configured to:
        determine, using the first pressure, a position at which the electronic device is held;
        control one of the left-side display area or the right-side display area to display touch keys based on the position at which the electronic device is held; and
        select a vibration amplitude and a vibration direction of a vibration component based on the position at which the electronic device is held.

2. The electronic device of claim 1, wherein the pressure-sensitive components are further configured to detect a second pressure, and wherein the processor is further configured to control the electronic device to be maintained in a sleep state when the second pressure does not exceed a preset value.

3. The electronic device of claim 1, wherein the pressure-sensitive components are further configured to detect a second pressure, and wherein the processor is further configured to control the electronic device to start a display of the electronic device when the second pressure exceeds a preset value.

4. The electronic device of claim 1, wherein the processor comprises an artificial intelligence chip.

5. The electronic device of claim 1, wherein the touch keys comprise volume keys.

6. The electronic device of claim 1, wherein the touch keys comprise game keys.

7. The electronic device of claim 1, wherein the obverse-side display area comprises a flexible display screen, a touch panel, and a protection cover, wherein the touch panel is stacked on the flexible display screen, and wherein the protection cover is stacked on the touch panel.

8. The electronic device of claim 7, wherein the protection cover is an equal-thickness transparent cover plate.

9. A mobile terminal comprising:
an obverse-side display area;
a battery cover;
a left-side display area positioned between the obverse-side display area and the battery cover;
a right-side display area positioned between the obverse-side display area and the battery cover;
pressure-sensitive components configured to detect a first pressure; and
a processor coupled to the obverse-side display area, the left-side display area, the right-side display area, and the pressure-sensitive components and configured to:
determine, using the first pressure, a position at which the mobile terminal is held;
control one of the left-side display area or the right-side display area to display touch keys based on the position at which the mobile terminal is held; and
select a vibration amplitude and a vibration direction of a vibration component based on the position at which the mobile terminal is held.

10. The mobile terminal of claim 9, further comprising a middle frame, wherein the middle frame comprises:
an obverse side configured to support the obverse-side display area;
a reverse side configured to support the battery cover;
a left-side wall coupling the obverse side and the reverse side; and
a right-side wall coupling the obverse side and the reverse side.

11. The mobile terminal of claim 9, wherein the pressure-sensitive components are further configured to detect a second pressure, and wherein the processor is further configured to control the mobile terminal to be maintained in a sleep state when the second pressure does not exceed a preset value.

12. The mobile terminal of claim 9, wherein the pressure-sensitive components are further configured to detect a second pressure, and wherein the processor is further configured to control the mobile terminal to start a display of the mobile terminal when the second pressure exceeds a preset value.

13. The mobile terminal of claim 9, wherein the processor comprises an artificial intelligence chip.

14. The mobile terminal of claim 9, wherein the touch keys comprise volume keys.

15. The mobile terminal of claim 9, wherein the touch keys comprise game keys.

16. The mobile terminal of claim 9, wherein the obverse-side display area comprises a flexible display screen, a touch panel, and a protection cover, wherein the touch panel is stacked on the flexible display screen, and wherein the protection cover is stacked on the touch panel.

17. The mobile terminal of claim 16 wherein the protection cover is an equal-thickness transparent cover plate.

18. A method comprising:
detecting, by pressure-sensitive components of an electronic device, a pressure applied to the electronic device;
determining, using the pressure, a position at which the electronic device is held;
controlling one of a left-side display area or a right-side display area of the electronic device to display touch keys based on the position at which the electronic device is held; and
selecting a vibration amplitude and a vibration direction of a vibration component based on the position at which the electronic device is held.

19. The method of claim 18, further comprising:
detecting, by the pressure-sensitive components, a second pressure; and
controlling the electronic device to be maintained in a sleep state when the second pressure does not exceed a preset value.

20. The method of claim 18, further comprising:
detecting, by the pressure-sensitive components, a second pressure; and
controlling the electronic device to start a display of the electronic device when the second pressure exceeds a preset value.

* * * * *